(12) United States Patent
Hong et al.

(10) Patent No.: US 8,814,409 B2
(45) Date of Patent: Aug. 26, 2014

(54) MOBILE TERMINAL

(75) Inventors: Sungjoon Hong, Gyeonggi-Do (KR);
Minkyu Si, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/600,001

(22) Filed: Aug. 30, 2012

(65) Prior Publication Data

US 2013/0265800 A1 Oct. 10, 2013

(30) Foreign Application Priority Data

Apr. 10, 2012 (KR) ........................ 10-2012-0037532

(51) Int. Cl.
*F21V 7/04* (2006.01)

(52) U.S. Cl.
CPC ........................ *F21V 7/04* (2013.01)
USPC ........................................ 362/602; 362/603

(58) Field of Classification Search
CPC ........................................................ F21V 7/04
See application file for complete search history.

(56) References Cited

U.S. PATENT DOCUMENTS

| | | | | |
|---|---|---|---|---|
| 7,896,511 B2 * | 3/2011 | Joo et al. | ......................... | 362/24 |
| 8,224,391 B2 * | 7/2012 | Kim et al. | ..................... | 455/566 |
| 8,244,320 B2 * | 8/2012 | Lee et al. | ................... | 455/575.4 |
| 8,504,113 B2 * | 8/2013 | Kim et al. | ..................... | 455/566 |
| 2008/0062670 A1 * | 3/2008 | Hong | .............................. | 362/26 |
| 2008/0187716 A1 * | 8/2008 | Yu et al. | ........................ | 428/138 |
| 2011/0069027 A1 * | 3/2011 | Kim et al. | ..................... | 345/173 |
| 2011/0304524 A1 * | 12/2011 | Seen | ............................... | 345/55 |
| 2012/0236587 A1 * | 9/2012 | Kim et al. | ..................... | 362/602 |
| 2013/0114194 A1 * | 5/2013 | Lee et al. | ................. | 361/679.01 |
| 2013/0114195 A1 * | 5/2013 | Lee et al. | ................. | 361/679.01 |
| 2013/0194782 A1 * | 8/2013 | Byun | ........................... | 362/97.1 |

\* cited by examiner

*Primary Examiner* — Mary Ellen Bowman

(74) *Attorney, Agent, or Firm* — Birch, Stewart, Kolasch & Birch, LLP

(57) ABSTRACT

A mobile terminal includes a signal input module for inputting a signal as an opening formed at a case of a terminal body is pressed, and the signal input module includes an input key, a light guiding unit, a key mold, a light emitting unit, a circuit board, a dome switch and an actuator, which are all integrally fixed together and moved by being pressed. The light emitting unit is accommodated in a key mold having an opening for allowing light to be transferred to the light guiding unit. The input key, the light guiding unit, the key mold and the light emitting unit are mounted onto one surface of the circuit board, the circuit board is moved by being pressed, and the dome switch mounted onto another surface of the circuit board is transformed so as to generate a signal.

21 Claims, 7 Drawing Sheets

MOBILE TERMINAL

CROSS-REFERENCE TO RELATED APPLICATIONS

Pursuant to 35 U.S.C. §119(a), this application claims the benefit of earlier filing date and right of priority to Korean Application No. 10-2012-0037532, filed on Apr. 10, 2012, the contents of which is incorporated by reference herein in its entirety.

BACKGROUND OF THE INVENTION

1. Field of the Invention

The present disclosure relates to a mobile terminal having an input key capable of emitting light from a periphery (edges) thereof.

2. Description of Related Art

A mobile device (mobile terminal, portable device, portable terminal) can be easily carried and have one or more of functions such as supporting voice and video telephony calls, inputting and/or outputting information, storing data and the like.

As it becomes multifunctional, the mobile terminal can be allowed to capture still images or moving images, play music or video files, play games, receive broadcast and the like, so as to be implemented as an integrated multimedia player.

Various new attempts have been made for the multimedia devices by hardware or software in order to implement such complicated functions.

As the mobile terminal is regarded as a personal belonging for expressing personality, various demands on design forms are made. The design forms include structural changes and improvements for making an appearance of the mobile terminal more attractive.

A peripheral area of a key may be configured to emit light to improve quality of the appearance of the mobile terminal and user convenience. Such light emitting area may be designed in various shapes to correspond to different shapes of keys.

BRIEF SUMMARY OF THE INVENTION

Therefore, an aspect of the detailed description is to provide a mobile terminal having an input key capable of uniformly emitting light from a periphery thereof.

To achieve these and other advantages and in accordance with the purpose of this specification, as embodied and broadly described herein, there is provided a mobile terminal including a signal input module movably installed on a frame of a terminal body so as to allow for inputting a signal when being pressed. The signal input module may include a body, a circuit part, a dome switch and an actuator. The body may have an upper surface exposed to the outside of the terminal body and a lower surface opposite to the upper surface, and be moved by being pressed. The circuit part may be cooperatively mounted on the lower surface of the body so as to transfer the signal. The dome switch may be mounted onto one surface of the circuit board to face the body, and configured to generate a signal in response to being pressed. The actuator may be mounted onto the dome switch to transfer the pressing force to allow the dome switch to be pressed, and come in contact with the frame when being pressed.

In accordance with one aspect of the present disclosure, the mobile terminal may further include a light emitting unit mounted onto a surface of the circuit part, opposite to the one surface having the dome switch, and configured to emit light to the outside of the terminal body.

In accordance with one aspect of the present disclosure, the body may include an input key exposed through the opening, and defining a space apart from the case, and a light guiding unit configured to cover the space and support the input key, so as to guide the light emitted from the light emitting unit to the outside of the terminal body through the opening.

In accordance with one aspect of the present disclosure, the light guiding unit may be made of a transparent or semi-transparent material, to guide the light emitted from the light emitting unit toward the space.

In accordance with one aspect of the present disclosure, at least part of the body may be formed of a transparent material, to transfer the light emitted from the light emitting unit toward the upper surface of the body.

In accordance with one aspect of the present disclosure, the input key may be formed of a metal to reflect the light emitted into the space.

In accordance with one aspect of the present disclosure, the body may include a key mold configured to support the light guiding unit and surround the light emitting unit so as to guide the flow of light emitted from the light emitting unit, and fixed to the circuit part so that the circuit part can be moved by the pressing.

In accordance with one aspect of the present disclosure, an outer circumference of the light guiding unit may be greater than an outer circumference of the input key exposed to the outside, and be smaller than the opening to prevent the light guiding unit from being separated from the case.

In accordance with one aspect of the present disclosure, the light guiding unit may include a first area formed on the key mold to allow the light to be transferred, the first area having at least part exposed through the opening, and a second area connected to the first area and overlapped by the light emitting unit so that the light can be incident thereon.

In accordance with one aspect of the present disclosure, a section of the input key may be configured such that a first width in a first direction can be greater than a second width in a second direction, which is perpendicular to the first direction.

In accordance with one aspect of the present disclosure, the light emitted from the light emitting unit may be reflected by an inner circumferential surface of the key mold to be scattered, and at least part of the inner circumferential surface may be formed as a tilt surface so that a space defined by the inner circumferential surface can become narrower toward the light emitting unit.

In accordance with one aspect of the present disclosure, the reflection surface may extend in the first direction to allow the light to be transferred to edges of the first width of the input key.

In accordance with one aspect of the present disclosure, the second area of the light guiding unit may contact the tilt surface of the key mold, and the key mold may be formed with a white color to reflect the light toward the light guiding unit.

In accordance with one aspect of the present disclosure, the mobile terminal may further include a fixing protrusion protruding from a lower surface of the input key, which faces the upper surface of the light guiding unit, toward the light guiding unit, and a fixing recess recessed into the upper surface of the light guiding unit to allow for insertion of the fixing protrusions therein.

In accordance with one aspect of the present disclosure, the fixing protrusion may have a hook formed to be locked at the light guiding unit to prevent the input key from being separated from the light guiding unit, and the fixing recess may have a stopping portion at which the hook is locked.

In accordance with one aspect of the present disclosure, the fixing protrusion and the fixing recess may extend in the first direction.

In accordance with one aspect of the present disclosure, the input key may include a plurality of anti-rotation recesses formed by being spaced apart from each other, and arranged in the first direction to prevent rotation of the input key, and the light guiding unit may include a plurality of anti-rotation protrusions protruding from the upper surface of the light guiding unit to be inserted into the anti-rotation recesses.

In accordance with one aspect of the present disclosure, the circuit part may be implemented as a flexible printed circuit board folded so that at least one area can be overlapped.

In accordance with another exemplary embodiment of the present disclosure, there is provided a mobile terminal including a case, an input key, a light guiding unit and a key mold. The case may define an appearance of a terminal body and have an opening. The input key may have at least part exposed through the opening, and be configured to input a signal in response to an external pressing force. The light emitting unit may be disposed inside the case to emit light. The light guiding unit may have at least part overlapping the light emitting unit and support the input key. The light guiding unit may have a light emitting area surrounding a peripheral area of the input key and be exposed through the opening so as to transfer light emitted from the light emitting unit to the outside of the terminal body. The key mold may be configured to support the light guiding unit and surround the light emitting unit so as to transfer the light from the light emitting unit toward the input key.

In accordance with one aspect of the present disclosure, the light emitting unit may include a plurality of light emitting members for emitting light with a plurality of colors, respectively, or a light emitting element for emitting light with a plurality of colors.

In accordance with one aspect of the present disclosure, the light emitting unit may be set to emit light with different colors according to events generated in the mobile terminal.

In accordance with one aspect of the present disclosure, the light emitting unit may be set to emit light or restrict emission of the light according to whether or not the input key is pressed.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention. In the drawings.

DETAILED DESCRIPTION OF THE INVENTION

Description will now be given in detail of an antenna device and a mobile terminal having the same according to the exemplary embodiments, with reference to the accompanying drawings. For the sake of brief description with reference to the drawings, the same or equivalent components will be provided with the same reference numbers, and description thereof will not be repeated. A singular representation may include a plural representation as far as it represents a definitely different meaning from the context.

A mobile terminal disclosed herein may include a portable phone, a smart phone, a laptop computer, a digital broadcast terminal, a personal digital assistant (PDA), a portable multimedia player (PMP), a navigator, and the like. However, it may be easily understood by those skilled in the art that the configuration according to the exemplary embodiments of this specification can be applied to stationary terminals such as digital TV, desktop computers and the like excluding a case of being applicable only to the mobile terminals.

Figure 1:
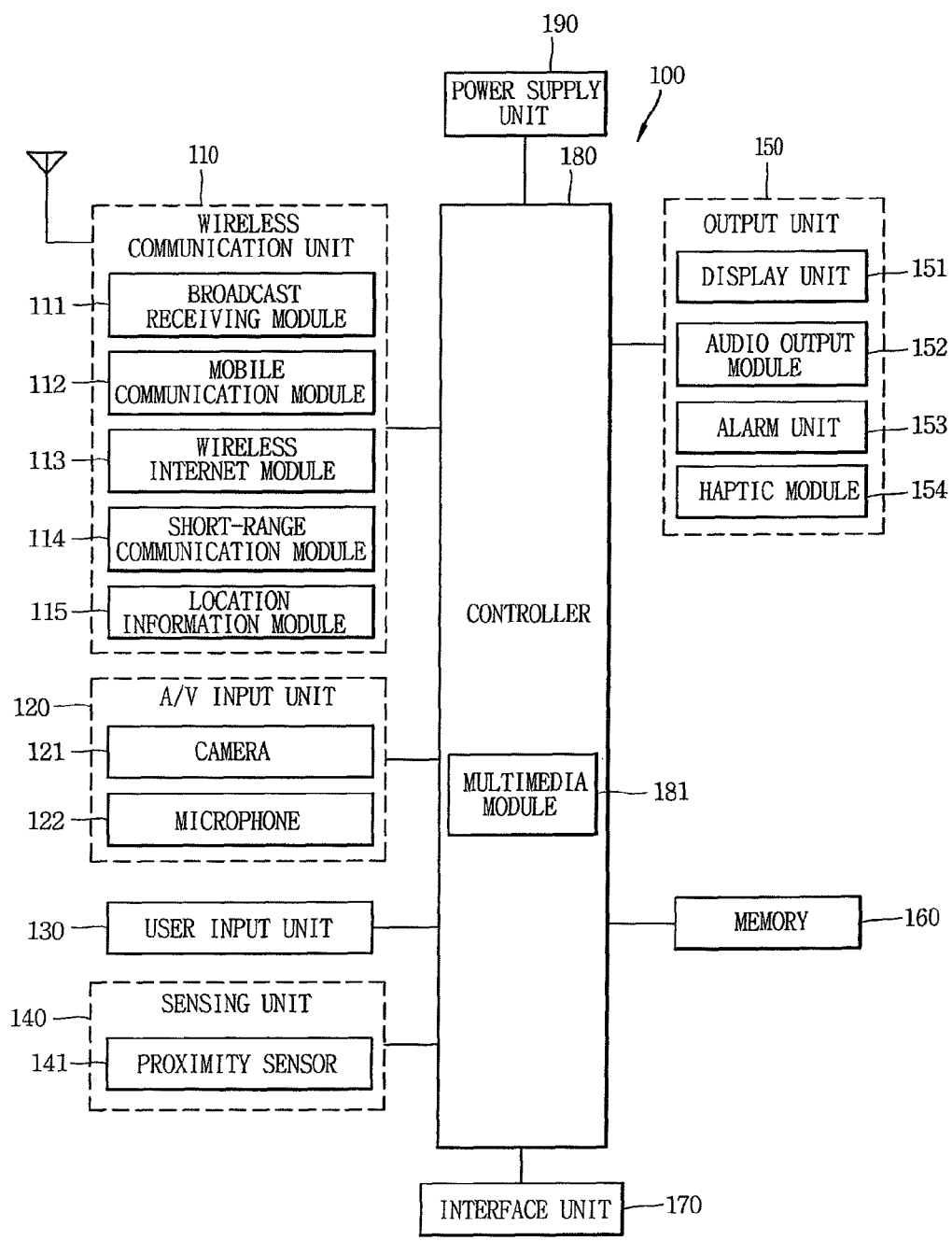
FIG. 1 is a block diagram of a mobile terminal in accordance with one exemplary embodiment.

FIG. 1 is a block diagram illustrating a mobile terminal associated with an exemplary embodiment.

The mobile terminal 100 may include a wireless communication unit 110, an Audio/Video (A/V) input unit 120, a user input unit 130, a sensing unit 140, an output unit 150, a memory 160, an interface unit 170, a controller 180, a power supply unit 190, and the like. However, all of the elements as illustrated in FIG. 1 are not necessarily required, and the mobile terminal may be implemented with greater or less number of elements than those illustrated elements.

Hereinafter, the constituent elements will be described in turn.

The wireless communication unit 110 typically includes one or more elements allowing radio communication between the mobile terminal 100 and a wireless communication system, or allowing radio communication between the mobile terminal 100 and a network in which the mobile terminal 100 is located. For example, the wireless communication unit 110 may include a broadcast receiving module 111, a mobile communication module 112, a wireless Internet module 113, a short-range communication module 114, a location information module 115, and the like.

The broadcast receiving module 111 receives broadcast signals and/or broadcast associated information from an external broadcast management server through a broadcast channel.

The broadcast channel may include a satellite channel and/or a terrestrial channel. The broadcast management server may mean a server that generates and transmits a broadcast signal and/or broadcast associated information or a server that receives a previously generated broadcast signal and/or broadcast associated information and transmits to the mobile terminal 100. The broadcast signal may include a TV broadcast signal, a radio broadcast signal and a data broadcast signal as well as a broadcast signal in a form that a data broadcast signal is coupled to the TV or radio broadcast signal.

The broadcast associated information may mean information regarding a broadcast channel, a broadcast program, a broadcast service provider, and the like. The broadcast associated information may also be provided through a mobile communication network, and in this case, the broadcast associated information may be received by the mobile communication module 112.

The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may receive a broadcast signal using various types of broadcast systems. In particular, the broadcast receiving module 111 may receive a digital broadcast signal using a digital broadcast system such as digital multimedia broadcasting-terrestrial (DMB-T), digital multimedia broadcasting-satellite (DMB-S), media forward link only (MediaFLO), digital video broadcast-handheld (DVB-H), integrated services digital broadcast-terrestrial (ISDB-T), and the like. The broadcast receiving module 111 is, of course, configured to be suitable for every broadcast system that provides a broadcast signal as well as the above-mentioned digital broadcast systems.

Broadcast signals and/or broadcast associated information received via the broadcast receiving module 111 may be stored in a suitable device, such as a memory 160.

The mobile communication module 112 transmits and/or receives a radio signal to and/or from at least one of a base station, an external terminal and a server over a mobile communication network. In this exemplary embodiment, the radio signal may include a voice call signal, a video call signal and/or various types of data according to text and/or multimedia message transmission and/or reception.

The wireless Internet module 113 is a module for supporting wireless Internet access. The wireless Internet module 113 may be built-in or externally installed to the mobile terminal 100. In this exemplary embodiment, the wireless Internet module 113 may use a wireless Internet access technique including a Wireless LAN (WLAN), Wi-Fi, Wireless Broadband (Wibro), World Interoperability for Microwave Access (Wimax), High Speed Downlink Packet Access (HSDPA), and the like.

The short-range communication module 114 is a module for supporting a short-range communication. In this exemplary embodiment, it may be used a short-range communication technology including Bluetooth, Radio Frequency IDentification (RFID), Infrared Data Association (IrDA), Ultra WideBand (UWB), ZigBee, and the like.

The location information module 115 is a module for checking or acquiring a location of the mobile terminal, such as a GPS module.

Referring to FIG. 1, the A/V input unit 120 receives an audio or video signal, and the A/V input unit 120 may include a camera 121 and a microphone 122. The camera 121 processes an image frame, such as still picture or video, obtained by an image sensor in a video phone call or image capturing mode. The processed image frame may be displayed on a display unit 151.

The image frames processed by the camera 121 may be stored in the memory 160 or transmitted to an external device through the wireless communication unit 110. Two or more cameras 121 may be provided according to the use environment of the mobile terminal.

The microphone 122 receives an external audio signal through a microphone in a phone call mode, a recording mode, a voice recognition mode, and the like, and processes the audio signal into electrical voice data. The processed voice data may be converted and outputted into a format that is transmittable to a mobile communication base station through the mobile communication module 112 in the phone call mode. The microphone 122 may implement various types of noise canceling algorithms to cancel noise generated in a procedure of receiving the external audio signal.

The user input unit 130 may generate input data to control an operation of the terminal. The user input unit 130 may be configured by including a keypad, a dome switch, a touch pad (pressure/capacitance), a jog wheel, a jog switch, and the like.

The sensing unit 140 detects a current status of the mobile terminal 100 such as an opened or closed state of the mobile terminal 100, a location of the mobile terminal 100, existence or non-existence of a user contact, an orientation of the mobile terminal 100 and the like, and generates a sensing signal for controlling the operation of the mobile terminal 100. For example, when the mobile terminal 100 is a slide phone type, it may sense an opened or closed state of the slide phone. Furthermore, the sensing unit 140 takes charge of a sensing function associated with whether or not power is supplied from the power supply unit 190, or whether or not an external device is coupled to the interface unit 170. Meanwhile, the sensing unit 140 may include a proximity sensor 141.

The output unit 150 is configured to provide an output for audio signal, video signal, or alarm signal, and the output unit 150 may include the display unit 151, an audio output module 152, an alarm unit 153, a haptic module 154, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or image capturing mode, the display unit 151 may display a captured image and/or received image, a UI or GUI.

The display unit 151 may include at least one of a Liquid Crystal Display (LCD), a Thin Film Transistor-LCD (TFT-LCD), an Organic Light Emitting Diode (OLED) display, a flexible display, and a three-dimensional (3D) display.

Some of those displays may be configured with a transparent or optical transparent type to allow viewing of the exterior through the display unit, and such displays may be called transparent displays. An example of a typical transparent display may include a transparent LCD (TOLED), and the like. Under this configuration, a user can view an object positioned at a rear side of a terminal body through a region occupied by the display unit 151 of the terminal body.

The display unit 151 may be implemented in two or more in number according to a configured aspect of the portable terminal 100. For instance, a plurality of the display units 151 may be arranged on one surface to be spaced apart from or integrated with each other, or may be arranged on different surfaces.

In embodiments where the display unit 151 and a touch sensitive sensor (referred to as a touch sensor) have an inter-layer structure, the structure may be referred to as a touch screen. The display unit 151 may be used as an input device in addition to being used as an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display unit 151 has been touched.

Referring to FIG. 1, a proximity sensor 141 may be arranged at an inner region of the portable terminal 100 covered by the touch screen, or near the touch screen. The proximity sensor may sense a presence or absence of an object approaching a surface to be sensed, or an object disposed near a surface to be sensed, by using an electromagnetic field or infrared rays without a mechanical contact. The proximity sensor has a longer lifespan and a more enhanced utility than a contact sensor.

The proximity sensor may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of convenience of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor senses proximity touch, and proximity touch patterns (e.g., distance, direction, speed, time, position, moving status, etc.). Information relating to the sensed proximity touch and the sensed proximity touch patterns may be output onto the touch screen.

The audio output module 152 may output audio data received from the wireless communication unit 110 or stored in the memory 160 in a call-receiving mode, a call-placing mode, a recording mode, a voice recognition mode, a broadcast reception mode, and the like. The audio output module 152 may output audio signals relating to functions performed in the mobile terminal 100, e.g., sound alarming a call received or a message received, and so on. The audio output module 152 may include a receiver, a speaker, a buzzer, and so on.

The alarm unit 153 outputs signals notifying occurrence of events from the mobile terminal 100. The events occurring from the mobile terminal 100 may include a call received, a message received, a key signal input, a touch input, and the like. The alarm unit 153 may output not only video or audio signals, but also other types of signals such as signals notifying occurrence of events in a vibration manner. Since the video or audio signals can be output through the display unit 151 or the audio output unit 152, the display unit 151 and the audio output module 152 may be categorized into a part of the alarm unit 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects (signals) through a user's direct contact, or a user's muscular sense using a finger or a hand. The haptic module 154 may be implemented in two or more in number according to the configuration of the mobile terminal 100.

The memory 160 may store a program for the processing and control of the controller 180. Alternatively, the memory 160 may temporarily store input/output data (e.g., phonebook data, messages, still images, video and the like). Also, the memory 160 may store data related to various patterns of vibrations and audio output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the mobile terminal 100 with external devices. The interface unit 170 may allow a data reception from an external device, a power delivery to each component in the portable terminal 100, or a data transmission from the portable terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as 'identification device') may be implemented in a type of smart card. Hence, the identification device can be coupled to the mobile terminal 100 via a port.

Also, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like.

The controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image.

The power supply unit 190 provides power required by various components under the control of the controller 180. The provided power may be internal power, external power, or combination thereof.

Various embodiments described herein may be implemented in a computer-readable medium using, for example, software, hardware, or some combination thereof.

For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

Description will now be given in detail of an antenna device and a mobile terminal having the same according to the exemplary embodiments, with reference to the accompanying drawings. For the sake of brief description with reference to the drawings, the same or equivalent components will be provided with the same reference numbers, and description thereof will not be repeated. A singular representation may include a plural representation as far as it represents a definitely different meaning from the context.

Figure 2A:
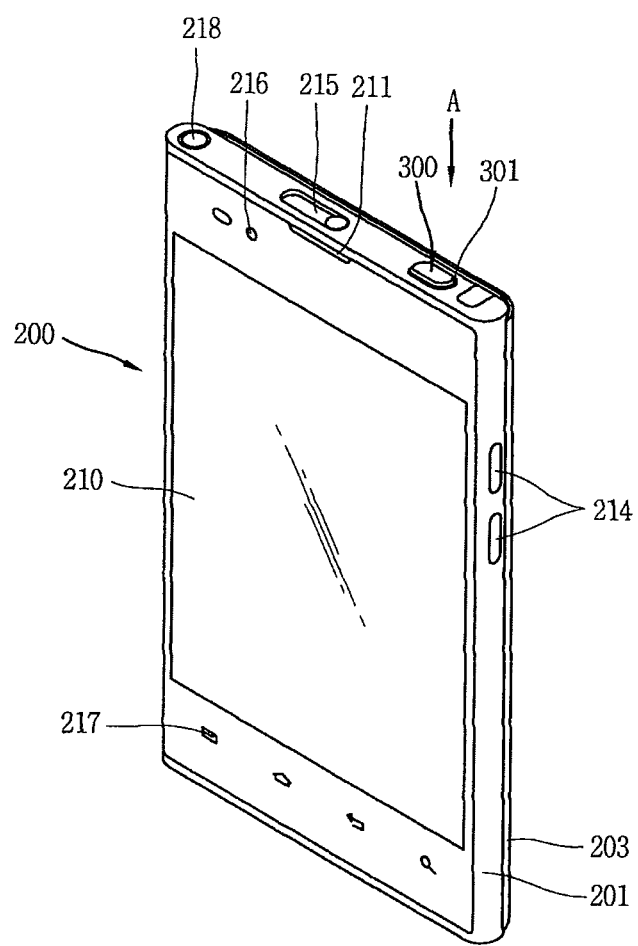
FIG. 2A is a front perspective view of the mobile terminal.
Figure 2B:
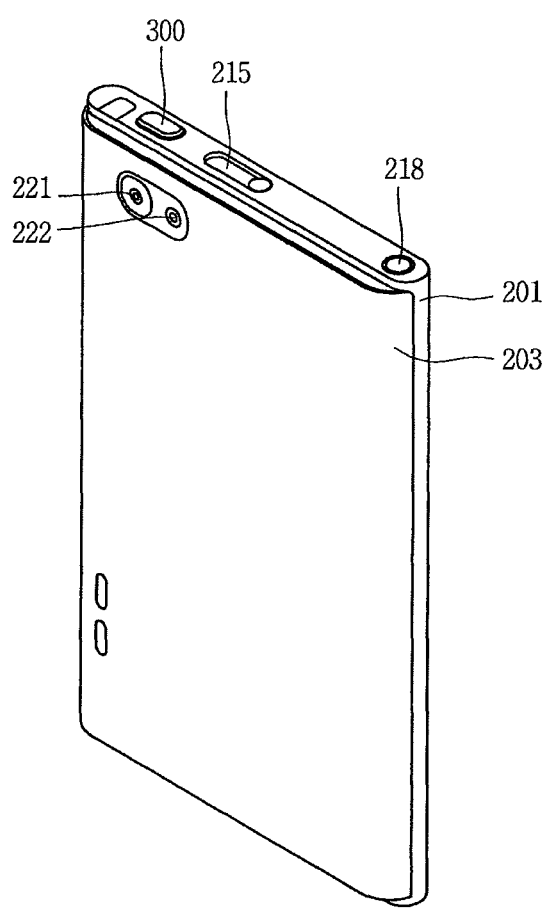
FIG. 2B is a rear perspective view of the mobile terminal shown in FIG. 2A.

FIG. 2A is a front perspective view illustrating an example of a mobile terminal, and FIG. 2B is a rear perspective view of the mobile terminal shown in FIG. 2A.

Referring to FIGS. 2A and 2B, the mobile terminal 200 disclosed herein is provided with a bar-type terminal body. However, the present application is not limited to this type of terminal, but is also applicable to various structures of terminals such as slide type, folder type, swivel type, swing type, and the like, in which two or more bodies are combined with each other in a relatively movable manner. In addition, the mobile terminal disclosed herein may be applied to a random portable electronic device having a camera and a flash, examples of which may include a portable phone, a smart phone, a laptop computer, a digital broadcast terminal, a personal digital assistant (PDA), a portable multimedia player (PMP), and the like.

A body may include a case (or referred to as casing, housing, cover, etc.) defining an appearance of the mobile terminal 100. In this exemplary embodiment, the case may be divided into a front case 201, a rear case 202 for covering an opposite surface to the front case 201, and a battery cover 203 coupled to the rear case 202 to define a rear face of the mobile terminal 200. At least one intermediate frame (case) (e.g., see 204 in FIG. 3) may be formed between the front and rear cases 101 and 102 so as to accommodate various electronic components. Such cases may be injected using a synthetic resin or be formed of a metal, such as stainless steel (STS), titanium (Ti) or the like.

The terminal body is shown, on a front surface thereof, having a display unit 210, a first audio output module 211, a front camera 216, a side key 214, an interface unit 170, a signal input unit 217 and the like.

The display unit 210 may include a Liquid Crystal Display (LCD) module, an Organic Light Emitting Diodes (LED) module, an e-paper and the like for displaying visible information. The display unit 210 may include a touch sensing unit for allowing an input in a touching manner. Hereinafter, the display unit 210 having the touch sensing unit is referred to as 'touch screen'. When a touch input is detected on any position on the touch screen 210, a content corresponding to the touched position may be input. The contents generated by such touch input may include text, numbers, instructions in various modes, menu items to be set, or the like. The touch sensing unit may be transparent so that the display unit can be viewed therethrough, and have a structure for enhancing visibility of the touch screen at a bright place. Referring to FIG. 2A, the touch screen 210 occupies most of the front surface of the front case 201.

The first audio output module 211 may be implemented as a receiver for forwarding a call sound to a user's ear or a type of a loud speaker for outputting various alarm sounds or a reproduction sound of multimedia.

The front camera 216 may process image frames, such as still images or video, obtained by an image sensor in a telephony call mode or a capturing mode. The processed image frames may be displayed on the display unit 210.

The image frames processed by the front camera 216 may be stored in the memory 160 or transmitted to an external device through the wireless communication unit 110. Two or more front cameras 216 may be provided according to the use environment of the mobile terminal.

The signal input unit 217 may be manipulated to receive a command for controlling operations of the mobile terminal 200, and may include a plurality of input keys. The input keys may be commonly designated as a manipulating portion, and any method may be employed if it is implemented in a tactile manner allowing the user to perform manipulation with a tactile feeling.

For example, the signal input unit 217 may be implemented as a dome switch, a touch screen or a touchpad allowing a user to input a command or information in a pushing or touching manner, or a wheel, a jog or a joystick for rotating a key. Various contents may be input by the signal input unit 217. For instance, the signal input unit 217 may allow for inputting commands, such as start, end, scroll, or the like.

The rear surface of the terminal body is shown having a battery (power supply unit) 240, a rear camera 221 and the like.

A flash (not shown) and a mirror (not shown) may be disposed adjacent to the rear camera 221. The flash operates to light an object to be captured when taking the object using the rear camera 221.

The mirror can cooperate with the rear camera 221 to allow a user to photograph himself in a self-portrait mode.

The rear camera 221 may face a direction which is opposite to a direction faced by the front camera 216, and may have different pixels from those of the front camera 216.

For example, the front camera 216 may operate with relatively lower pixels (lower resolution). Thus, the front camera 216 may be useful when a user can capture his face and send it to another party during a video call or the like. On the other hand, the rear camera 221 may operate with a relatively higher pixels (higher resolution) such that it can be useful for a user to obtain higher quality pictures for later use. The front and rear cameras 216 and 221 may be installed in the terminal body to be rotatable or popped up.

The battery 240 may supply power to the mobile terminal 200. The battery 240 may be mounted in the terminal body or detachably coupled directly onto the outside of the terminal body.

A side surface of the front case 201 is shown having a side key 214, an interface unit 215, an audio input unit (not shown), an ear jack 218, a power key 300, also referred to as a signal input module, and the like.

The side key 214 may be commonly designated as a manipulating portion, and any method may be employed if it is implemented in a tactile manner allowing the user to perform manipulation with a tactile feeling. The contents inputted by the side key 214 may be set in various ways. For example, the side key 214 may be set to receive commands, such as controlling of the image input units 216, 221, adjusting a volume level output from the audio output module 211, converting the display unit 210 into a touch recognition mode.

The audio input unit (not shown) may be implemented, for example, as a type of microphone for receiving user's voice, other sounds and the like.

The interface unit 215 may serve as a path for data exchange between the mobile terminal 200 and external devices. For example, the interface unit 215 may be at least one of a connection terminal for connecting an earphone in a wireless or wired manner, a port for a short-range communication (for example, Infrared (IrDA) port, Bluetooth port, wireless LAN port, etc.) or power supply terminals for supplying power to the mobile terminal 200. The interface unit 215 may be implemented as a type of socket for accommodating an external card, such as a Subscriber Identification Module (SIM), User Identity Module (UIM), a memory card for storage of information.

The ear jack 218 may be formed to allow for an insertion of a plug of an ear phone therein, and may output an audio sound or sounds during a call communication.

A side surface of the mobile terminal 200 may be shown having a signal input module 300 formed to control power of the mobile terminal 200. The signal input module 300 may be pressed by a user to input a signal, but may not be limited to the structure.

A light emitting unit 340 (see FIG. 5A) may be disposed inside the signal input module 300. Accordingly, a light emitting area 301 may be formed as a peripheral (edge) area of the signal input module 300. The light emitting area 301 may be set to be driven according to a state of the mobile terminal 200.

Figure 3:
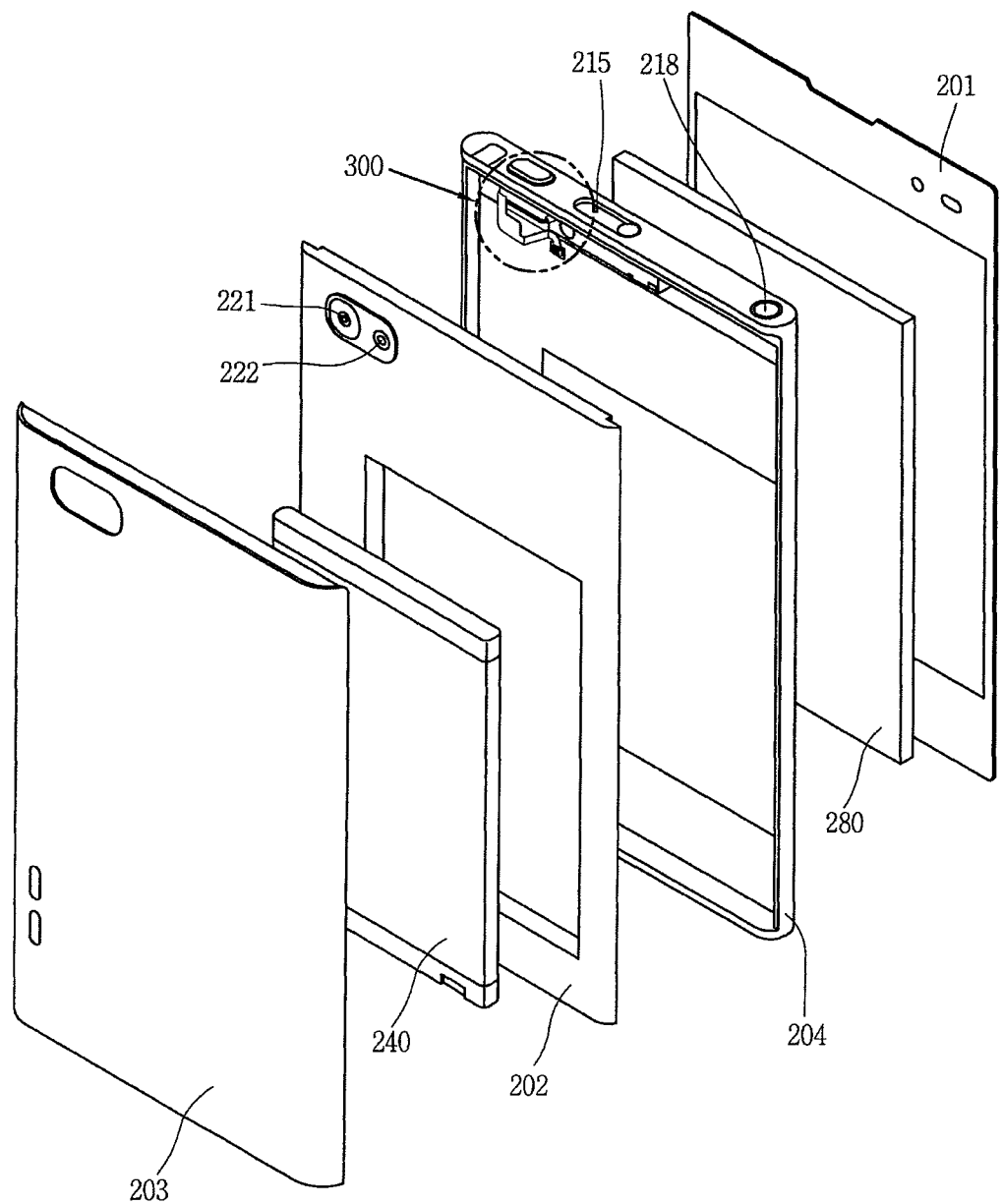
FIG. 3 is a disassembled view of FIG. 2B.

FIG. 3 is a disassembled view of FIG. 2B.

As shown in FIGS. 2A and 2B and FIG. 3, the mobile terminal 200 may include the front case 201, the rear case 202, the battery cover 203, and an intermediate frame 204. A main circuit board 280 may be disposed between the front case 201 and the intermediate frame 204, and the battery 240 may be disposed between the rear case 202 and the battery cover 203.

The mobile terminal 200 may include the signal input module 300 disposed at the side surface of the terminal body to control power or the like of the mobile terminal 200. The signal input module 300 may be pressed by a user to input a signal and the signal may be transferred to the main circuit board 280. The mobile terminal 200 may be implemented to be powered on or off by the signal input module 300.

The signal input module 300 may be installed at the intermediate frame 204. At least part of the signal input module 300 may be exposed to the outside of the mobile terminal 200.

Hereinafter, a detailed structure of the signal input module 300 will be described.

Figure 4:
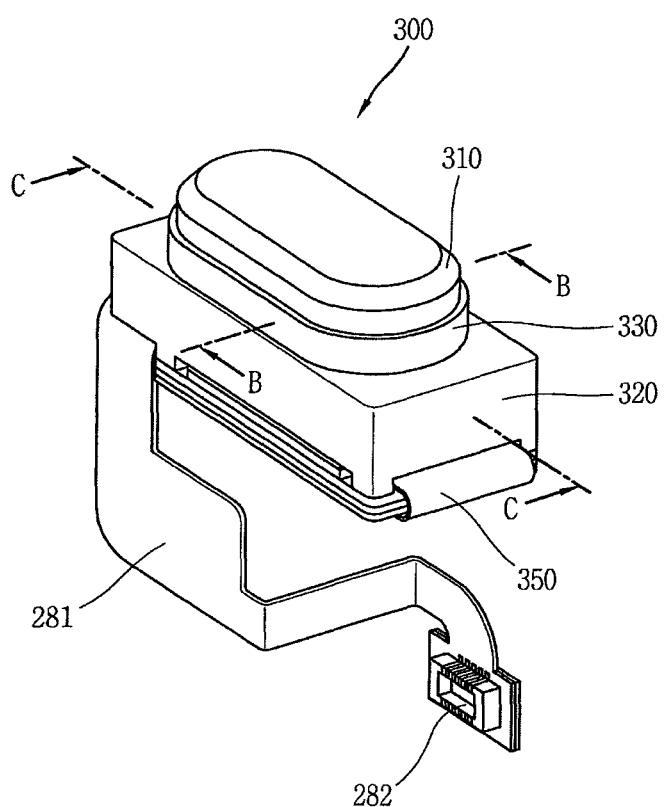
FIG. 4 is a perspective view of a signal input module.
Figure 5A:
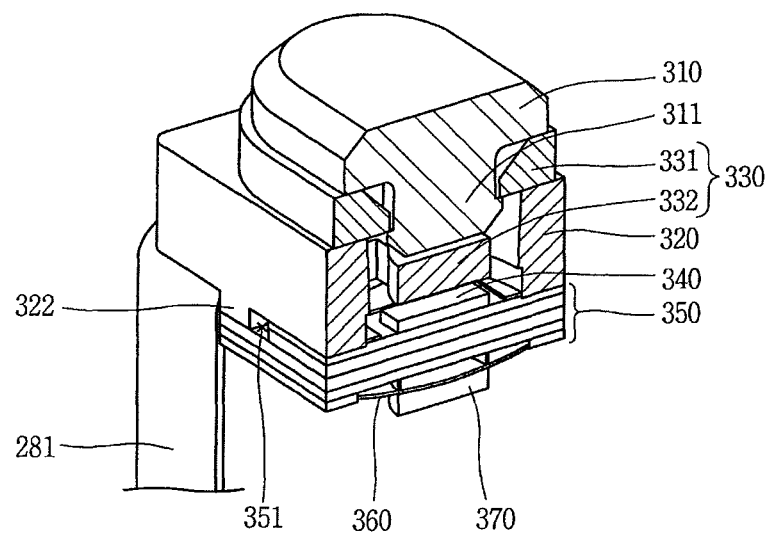
FIG. 5A is a sectional view of the signal input module, taken along the line B-B of FIG. 4.
Figure 5B:
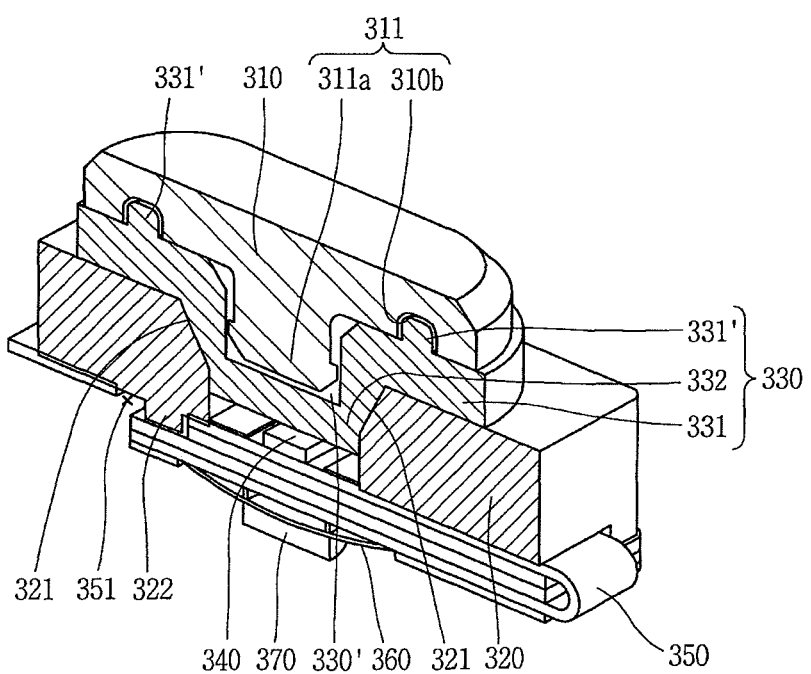
FIG. 5B is a sectional view of the signal input module, taken along the line C-C of FIG. 4.
Figure 6:
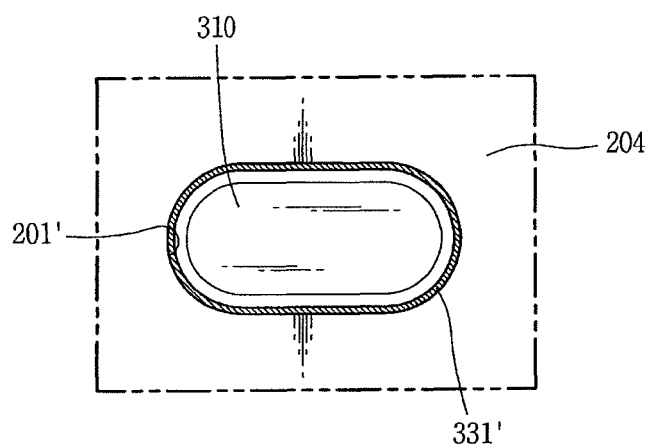
FIG. 6 is a planar view of the signal input module of FIG. 3 viewed in a direction A.

FIG. 4 is a perspective view of a signal input module, FIG. 5A is a sectional view of the signal input module taken along the line B-B of FIG. 4, FIG. 5B is a sectional view of the signal input module taken along the line C-C of FIG. 4, and FIG. 6 is a planar view of the signal input module of FIG. 3 viewed in a direction A.

As shown in FIGS. 3 to 5B, the signal input module 300 may include a body, a circuit part 350, a dome switch 360, an actuator 370, a flexible printed circuit board 281, and a connector 282.

When the body is moved due to being pressed by a user, the actuator 370 and the dome switch 360 are pressed, which allows a signal to be transferred to the circuit part 350. Referring to FIG. 5, the body may be fixed onto the intermediate frame 204. That is, the intermediate frame 204 may include an opening for fixing the body. Also, the front case 201 may include a supporting protrusion protruding to support the body. In detail, the supporting protrusion may be formed to support a lower portion of the body which is pressed by an external force.

The signal may be transferred to the main circuit board 280 via the flexible printed circuit board 281 and the connector 282, which are connected to the main circuit board 280 within the terminal body. The body may include a key mold 320, a light guiding unit 330 formed on the key mold 320, and an input key 310 disposed on the light guiding unit 330 and exposed to the outside of the terminal body.

Referring to FIGS. 5A and 5B, the body may be mounted onto the circuit part 350. The dome switch 360 and the actuator 370 may be fixed onto a lower surface of the circuit part 350. The circuit part 350 to which the dome switch 360 and the actuator 370 are fixed may be disposed on the intermediate frame 204.

A light emitting unit 340 may be disposed on the circuit part 350. The light emitting unit 340 may be implemented as a Light Emitting Diode (LED). The light emitting unit 340 may be, but not limited to, an LED which emits light with a white color. The light emitting unit 340 may alternatively be implemented as an LED for emitting light with one color or an LED module for emitting light with plural colors, or include a plurality of LEDs.

The key mold 320 may be formed on the circuit part 350. The key mold 320 may surround the light emitting unit 340. That is, the key mold 320 may have an accommodation space in an area corresponding to the light emitting unit 340, and define an outer wall of the signal input module 300. The key mold 320 may be preferably formed so that the light emitting unit 340 may be disposed in a central portion of the space so as to evenly emit light to every area.

More concretely, the key mold 320 may have a front opening (not shown) formed to face the input key 310, and a rear opening (not shown) formed to face the front opening for accommodating the circuit part 350, to which the light emitting unit 340 is electrically connected.

The key mold 320 may prevent reflection of light emitted from the light emitting unit 340 so that the light cannot be transferred to a side of the signal input module 300, for example, to the display unit or a rear surface of the mobile terminal 200. This may result in preventing light leakage to another area.

The key mold 320 may be formed to be opaque so as to prevent the light transmission. Especially, the key mold 320 may be formed with a white color. A white material has a property of reflecting light, so the light emitted from the light emitting unit 340 may be reflected by the white key mold 320. This structure may increase a quantity of light emitted to the outside, resulting in further improving brightness of a periphery of the input key 310.

The input key 310 may be exposed to the outside of the terminal body, namely, correspond to an area that a user directly presses with a hand or finger. The input key 310 may be formed to have various sizes and shapes according to usage. The input key 310 may form a space apart from the intermediate frame 204. That is, the light emitted from the light emitting unit 340 may be transmitted to the outside of the terminal body via the space between the input key 310 and the intermediate frame 204.

The input key 310 and the intermediate frame 204 may be set to maintain a uniform distance therebetween. Therefore, light may be relatively evenly transferred to the space defined as the light emitting area 301.

The input key 310 may have a section that a first width in a first direction (i.e., a long axial direction) is wider than a second width in a second direction (i.e., a short axial direction), which is perpendicular to the first direction. Since the second width is relatively narrow, a slim mobile terminal may be implemented and a user may feel easy to press the input key 310.

The input key 310 may be formed such that light can be emitted along an outer circumferential surface thereof. The input key 310 may be formed of a metallic material. Hence, quality (luxuriousness) of an appearance of the input key 310 may be improved by using a metallic key having a property of reflecting light.

Referring to FIG. 5A, the light guiding unit 330 may be formed among the light emitting unit 340, the key mold 320 and the input key 310. The light guiding unit 330 may be formed to transfer light emitted from the light emitting unit 340 to the outside. For example, the light guiding unit 330 may be formed by injecting acryl. The light guiding unit 330 may be formed of a transparent or semi-transparent material. Brightness of light transmitted to the outside may be controlled according to transmittancy of the light guiding unit 330. Also, the light guiding unit 330 may be painted with at least one color. The color may be variable according to an appearance of the mobile terminal 200 and the color painted on the input key 310. This may thus result in improvement of visual luxuriousness of the mobile terminal 200.

At least one area of the light guiding unit 330 may be exposed to the outside of the terminal body. The light guiding unit 330 may include first and second areas 331 and 332 connected to each other into one body. The first area 331 may be supported by the key mold 320.

The light may be transmitted to the outside of the terminal body via the first area 331. An outer circumference of the first area 331 may correspond to an outer circumference of the input key 310. That is, the outer circumference of the first area 331 may be oval. The outer circumference of the first area 331 may be greater than that of the input key 310. Hence, the first area 331 except for a portion shielded by the input key 310 may be exposed to the outside of the terminal body.

Preferably, a width of the externally exposed portion of the first area 331 may be even along the outer circumference of the input key 310 so that light transmitted through the periphery of the input key 310 can have a uniform width. This may allow the light emitting area 301 to be uniformly formed and the appearance of the mobile terminal to be simple. Here, depending on design forms, the exposed portion of the first area 331 may be formed to be uneven, thereby arousing an aesthetical feeling.

Referring to FIGS. 3 and 6, an opening 201' in which the input key 310 is disposed may be formed at the intermediate frame 204, which defines the side surfaces of the mobile terminal 200. The opening 201' may preferably be formed in a shape corresponding to the section of the input key 310. The input key 310 may protrude higher than a surface of the intermediate frame 204.

The opening 201' may allow light to be transmitted therethrough.

An inner circumference of the opening 201' may be greater than an outer circumference of the light guiding unit 330. The input key 310 and the light guiding unit 330 may be movable through the opening 201', in response to be pressed. Here, the inner circumference of the opening 201' may be smaller than an outer circumference of the key mold 320. This may prevent the signal input module 300 from being separated from the intermediate frame 204.

The light emitted from the light emitting unit 340 may be incident onto the second area 332. That is, the second area 332 of the light guiding unit 330 may be configured such that at least one area can overlap the light emitting unit 340.

The second area 332 may be formed to fill up a section of the space formed by the key mold 320. That is, an inner circumferential surface of the key mold 320 may contact an outer circumferential surface of the second area 332. Therefore, the light may all be transferred to the light guiding unit 330 without being leaked between the key mold 320 and the light guiding unit 330, thereby maximizing the light transfer.

The first and second areas 331 and 332 may be integrally connected to each other. A reflection surface 321 may be formed at a connection area between the first and second areas 331 and 332. The reflection surface 321 may be formed by a surface where the key mold 320 and the light guiding unit 330 contact each other.

The reflection surface 321 may be implemented as a chamfer of the key mold 320. That is, the reflection surface 321 may be a tilt surface of the key mold 320, which is formed such that a section of the space can be wider from the light emitting unit 340 toward the outside. That is, the light guiding unit 330 may have a tilt surface to correspond to the tilt surface of the key mold 320.

The reflection surface 321 may be formed in the first direction. Light emitted from the light emitting unit 340 may be incident onto the second area 332 to be transferred to the first area 331. The light may undergo a plurality of processes within the light guiding unit 330 and at a boundary which the light guiding unit 330 contacts the key mold 320.

Both end portions (edges) of the input key 310 in the first direction may be farther from the light emitting unit 340 than both end portions of the input key 310 in the second direction. This may cause less light to reach the end portions in the first direction. Here, light collided onto the reflection surface 321 may be reflected to go farther from the light emitting unit 340. Therefore, this may increase a quantity of light which reaches up to the both end portions in the first direction, located at a relatively farther distance, and accordingly improve uniformity of light reaching the first area 331 of the light guiding unit 330.

This may result in obtaining uniformity of light transferred to the periphery of the input key 310 and improving quality of an appearance thereof.

The signal input module 300 may be formed in one fixing structure. That is, the components of the signal input module 300 may be fixed together.

The light emitting unit 340 may be installed on one surface of the circuit part 350, and the dome switch 360 may be formed on another surface of the circuit part 350. The circuit part 350 may be implemented as a flexible printed circuit board. That is, the one flexible printed circuit board may be folded to overlap each other. In other words, the dome switch 360 and the light emitting unit 340 may be installed on one surface of the flexible printed circuit board, and then the flexible printed circuit board may be folded such that the dome switch 360 and the dome switch 340 may face different directions. Here, the present invention may not be limited to the structure, but implemented by using a plurality of circuit boards fixed to each other.

The dome switch 360 may be fixed in a manner of being attached onto the circuit part 350 using an adhesive tape or the like. At least one contact terminal may be formed between the dome switch 360 and the circuit part 350. Accordingly, when the dome switch 360 is transformed to contact the contact terminal, a signal may be transferred.

The actuator 370 may be attached onto an outer surface of the dome switch 360. The actuator 370 may be formed on the intermediate frame 204. The actuator 370 may be disposed to form a space apart from the intermediate frame 204 or contact the intermediate frame 204. Here, for forming the space, the space may be narrow enough to switch the dome switch 360 as a user presses. In order to evenly receive the user's pressing force, the actuator 370 may preferably be formed in a central portion of the input key 310.

The key mold 320 may be disposed on one surface of the circuit part 350 where the light emitting unit 340 is formed. When the user presses the input key 310, the key mold 320 may press the circuit part 350 by the user's force.

To guide the key mold 320 and the circuit part 350 to be fixed to each other, at least one guide protrusion 322 may protrude from a surface of the key mold 320, which faces the circuit part 350. Also, a guide groove 351 may be formed at one area of the circuit part 350 for insertion of the guide protrusion 322 therein. The key mold 322 may be formed by injection molding.

The guide protrusion 322 and the guide groove 351 may allow the key mold 320 to be stably fixed to the circuit part 350 even when the signal input module 300 is pressed by the user. This may result in improvement of durability of the signal input module 300.

The second area 332 of the light guiding unit 330 may be inserted into a space of the key mold 320, and the first area 331 may be mounted onto the key mold 320. The input key 310 may be fixed onto the light guiding unit 330.

A coupling element 311 may be formed at a lower portion of the input key 310 to fix the input key 310 to the light guiding unit 330. The coupling element 311 and the input key 310 may be integrally formed by double injection molding or separately fabricated and then assembled to each other.

A fixing protrusion 311a may protrude from the coupling element 311 toward the light guiding unit 330. The fixing protrusion 311a may have a hook to be locked at the light guiding unit 330.

Referring to FIG. 5B, a fixing recess 330' in which the fixing protrusion 311a is inserted may be recessed into the second area 332 of the light guiding unit 330. Referring to FIG. 5A, a stopping portion at which the hook of the fixing protrusion 311a is locked may be formed at the first area 331 of the light guiding unit 330.

The fixing protrusion 311a and the fixing recess 330' may prevent the input key 310 from being separated from the light guiding unit 330, resulting in improvement of durability of the signal input module 300.

Still referring to FIG. 5B, two anti-rotation recesses 310b may be recessed into a surface of the coupling element 311 facing the light guiding unit 330. The anti-rotation recesses 310b may be formed in series in the first direction (long axial direction). Also, anti-rotation protrusions 331' which are inserted into the anti-rotation recesses 310b may protrude from the first area 330 of the light guiding unit 330.

The input key 310 may be formed long in the first direction so as to be rotatable when being pressed by a user. However, since the anti-rotation recesses 310b and the anti-rotation protrusions 331' are coupled to each other in the first direction, the input key 310 may be prevented from being separated from the light guiding unit 331 due to the rotation. Therefore, the durability of the signal input module 300 may be improved.

As the user presses the signal input module 300, a signal may be input. The user may press the input key 310 exposed to the outside of the mobile terminal. The input key 310 may sequentially press the light guiding unit 330 and the key mold 320. The key mold 320 may thus transform (move) the circuit part 350 and the actuator 370. The actuator 370 may then contact the intermediate frame 204, and the dome switch 360 may accordingly be switched on by the user's pressing force. A signal generated by the dome switch 360 may be transferred to the main circuit board 280 of the mobile terminal via the circuit part 350, the flexible printed circuit board 281 and the connector 282.

The light emitting unit 340 may be mounted in the signal input module 300, accordingly, light may be emitted through the first area 331 of the light guiding unit 330, which is exposed through an edge of the input key 310.

The mobile terminal may further include a controller (not shown) to control driving of the light emitting unit 340. The controller may control the light emitting unit 340 to be turned on or off based on at least one event generated in the mobile terminal.

Also, when the light emitting unit 340 is configured to emit light with a plurality of different colors, the controller may control the light emitting unit 340 to emit light with different colors matching a plurality of events, respectively.

The controller may also control the light emitting unit 340 to emit light with different colors, which match a charged state of the battery 240, or to be turned on or off based on whether or not the battery 240 is charged or discharged. For example, when the battery 240 is being charged in a power-on state, the light emitting area 301 may be driven. This may be irrespective of an ON or OFF state of the display unit 210. On the other hand, when the battery 240 is being charged in a low speed mode in a power-off state, the light emitting area 301 may be driven to be alternately turned on or off when an error is generated in the battery 240. That is, in this case, the light emitting area 301 may be flickered. Also, when the battery 340 is being charged in the power-off state, the light emitting area 301 may be driven. Afterwards, when the battery 240 is fully charged, the driven light emitting area 301 may be stopped.

Meanwhile, when a signal is input by pressing the signal input module 300, for example, when the user turns the mobile terminal on or the display unit 210 is in a deactivated state, for example, the display unit 210 is activated from a sleep mode or an idle mode, the light emitting area 301 may be driven and then turned off after a preset time elapses since being pressed. According to the exemplary embodiment, the user may recognize a state of a signal being input in a visible manner as well as in a tactile manner when the input key 310 is pressed.

The light emitting area 301 may be set to be kept driven while the display unit 210 is activated. According to the exemplary embodiment, whether or not the display unit 210 is in the activated state may be known by whether or not the light emitting area 301 is driven. The display unit 210 may be set to be deactivated, namely, lighted off in response to the signal input module 300 being pressed.

The light emitting area 301 may be set to emit light with different colors according to events generated in the mobile terminal, for example, when the mobile terminal receives or transmits a message event (such messages may include all kinds of messages transmitted or received in the mobile terminal via a Short Message Service (SMS), a Long Message Service (LMS), a Multimedia Message Service (MMS) allowing attachment of a multimedia file, or an Instant Message Service (IMS)), when a notice for a missing call is received, when other notice events are received, etc.

Also, the light emitting area 301 may be set to emit light in different manners according to such events. For example, a user may recognize different states of the mobile terminal according to a difference of a flickering speed, a method of changing a plurality of colors upon emitting light, and the like. That is, the controller may control the light emitting unit to be turned on or off according to preset rhythm which matches each of the events.

The use of the light emitting area 301 may allow for indicating various states of the mobile terminal, so the display unit 210 may not have to be activated for each of the events. That is, when those events are generated in the mobile terminal, at least one of the display unit 210 and the light emitting area 301 may be set to be driven. This may result in reduction of power consumption due to driving the display unit 210, thereby reducing battery consumption.

However, the present disclosure may not be limited to the structure. Also, the driving method of the light emitting area 301 may be randomly varied according to a user setting.

According to the configuration of the signal input module, the input key and the dome switch are installed on both surfaces of the circuit board such that the light emitting unit can be disposed in the central portion of the input key. This may allow light to be evenly emitted to the peripheral area of the input key.

Also, light may reach up to both ends in the long axial direction by virtue of the reflection surface extending in the long axial direction, thereby improving uniformity of light emitted to the light emitting area.

The fixing protrusion, the fixing recess, the anti-rotation protrusions and the anti-rotation recesses may arouse an improvement of durability of the signal input module.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
a terminal body, the terminal body having a frame; and
a signal input module movably installed at the frame of the terminal body so as to allow for inputting a signal when a pressing force is applied, the signal input module being disposed on a portion of the frame, the signal input module including:
a circuit part configured to transfer the signal;
a body disposed on one surface of the circuit part, the body having an upper surface exposed outside the terminal body and a lower surface opposite to the upper surface, the body being moveable when the pressing force is applied;
a dome switch formed on the other surface of the circuit part to face the body; and
an actuator attached on the dome switch and facing the portion of the frame to transfer the pressing force to allow the dome switch to be pressed,
wherein the actuator contacts the portion of the frame and is pressed by the pressing force when the body is moved.

2. The terminal of claim 1, further comprising a light emitting unit mounted at a surface of the circuit part opposite to said one surface having the dome switch, the light emitting unit configured to emit light outside the terminal body.

3. The terminal of claim 2, wherein the terminal body includes an opening through which the body of the signal input module is exposed, and
wherein the body includes:
an input key exposed through the opening in the terminal body such that a space is formed between the input key and the terminal body; and
a light guiding unit configured to cover the space and support the input key, the light guiding unit guiding the light emitted from the light emitting unit to the outside of the terminal body through the opening.

4. The terminal of claim 3, wherein the light guiding unit is made of a transparent or semi-transparent material, to guide the light emitted from the light emitting unit toward the space.

5. The terminal of claim 4, wherein the input key is formed of a metal to reflect the light emitted into the space.

6. The terminal of claim 3, wherein the body includes a key mold configured to support the light guiding unit and surround the light emitting unit so as to guide the flow of light emitted from the light emitting unit, the key mold being fixed to the circuit part such that the circuit part is moveable by the pressing force.

7. The terminal of claim 6, wherein an outer circumference of the light guiding unit is greater than an outer circumference of the input key exposed to the outside, and
wherein the outer circumference of the light guiding unit is smaller than the opening to prevent the light guiding unit from being separated from the terminal body.

8. The terminal of claim 7, wherein the light guiding unit includes:
a first area formed on the key mold, the first area being at least partially exposed through the opening; and
a second area connected to the first area and overlapping the light emitting unit such that the light emitted from the light emitting unit is incident thereon.

9. The terminal of claim 8, wherein a section of the input key is configured such that a first width in a first direction thereof is greater than a second width in a second direction thereof perpendicular to the first direction.

10. The terminal of claim 9, wherein the light emitted from the light emitting unit is reflected by an inner circumferential surface of the key mold to be scattered, and wherein at least part of the inner circumferential surface is a tilted surface so that a space defined by the inner circumferential surface narrows toward the light emitting unit.

11. The terminal of claim 10, wherein at least part of the inner circumferential surface extends in the first direction to allow the light to be transferred to edges of the input key defining the first width.

12. The terminal of claim 11, wherein the second area of the light guiding unit contacts the tilted surface of the key mold, and wherein the key mold is white to reflect the light toward the light guiding unit.

13. The terminal of claim 9, further comprising:

a fixing protrusion protruding from a lower surface of the input key and facing an upper surface of the light guiding unit; and a fixing recess recessed into the upper surface of the light guiding unit to allow for insertion of the fixing protrusion therein.

14. The terminal of claim 13, wherein the fixing protrusion has a hook formed to be locked at the light guiding unit to prevent the input key from being separated from the light guiding unit, and wherein the fixing recess has a stopping portion to which the hook is locked.

15. The terminal of claim 14, wherein the fixing protrusion and the fixing recess extend in the first direction.

16. The terminal of claim 9, wherein the input key includes a plurality of anti-rotation recesses spaced apart from each other and arranged in the first direction to prevent rotation of the input key, and wherein the light guiding unit includes a plurality of anti-rotation protrusions protruding from the upper surface of the light guiding unit and inserted into the anti-rotation recesses.

17. The terminal of claim 1, wherein the circuit part is a flexible printed circuit board that is folded such that the circuit part overlaps itself.

18. A mobile terminal comprising:

a case defining an appearance of a terminal body of the mobile terminal, the case having an opening;

an input key having at least one part exposed through the opening, the input key being configured to input a signal in response to an external pressing force;

a light emitting unit disposed inside the case and configured to emit light;

a light guiding unit that at least partially overlaps the light emitting unit, the light guiding unit supporting the input key, the light guiding unit defining a light emitting area surrounding a peripheral area of the input key and being exposed through the opening so as to transfer light emitted from the light emitting unit to the outside of the terminal body; and a key mold configured to support the light guiding unit and surround the light emitting unit so as to transfer the light from the light emitting unit toward the input key.

19. The terminal of claim 18, wherein the light emitting unit includes one of a plurality of light emitting members where each light emitting member emits a different color light or a light emitting element configured to emit a plurality of colors.

20. The terminal of claim 19, wherein the light emitting unit is set to emit light with different colors according to events generated in the mobile terminal.

21. The terminal of claim 18, wherein the light emitting unit is set to emit light or restrict emission of light according to whether or not the input key is pressed.

* * * * *